United States Patent [19]

Healey

[11] Patent Number: 5,212,587

[45] Date of Patent: May 18, 1993

[54] BINARY TREE SWITCHING NETWORK

[75] Inventor: Peter Healey, Ipswich, England

[73] Assignee: British Telecommunications plc, London, United Kingdom

[21] Appl. No.: 623,810

[22] PCT Filed: Jul. 6, 1989

[86] PCT No.: PCT/GB89/00770

§ 371 Date: Dec. 27, 1990

§ 102(e) Date: Dec. 27, 1990

[87] PCT Pub. No.: WO90/00757

PCT Pub. Date: Jan. 25, 1990

[30] Foreign Application Priority Data

Jul. 8, 1988 [GB]  United Kingdom ............... 8816278

[51] Int. Cl.⁵ ................... G11C 5/06; G02F 1/31
[52] U.S. Cl. ....................... 359/301; 359/303; 365/63; 365/64; 395/24
[58] Field of Search ............ 350/380, 382, 383; 371/37.1, 37.2; 370/4, 58.1, 60, 60.1; 395/22, 24; 359/298, 301, 303; 365/63, 64

[56] References Cited

U.S. PATENT DOCUMENTS

| | | | |
|---|---|---|---|
| 3,435,447 | 3/1969 | Duda et al. | 340/347 |
| 3,831,035 | 8/1974 | Hill. | |
| 4,461,543 | 7/1984 | McMahon. | |
| 4,569,050 | 2/1986 | Ohme | 371/37.1 |
| 4,605,921 | 8/1986 | Riddle et al. | 371/37.2 |
| 4,904,881 | 2/1990 | Castro | 395/24 |
| 4,945,494 | 7/1990 | Penz et al. | 395/24 |
| 4,954,963 | 9/1990 | Penz et al. | 395/24 |
| 4,999,525 | 3/1991 | Park et al. | 395/24 |
| 5,040,134 | 8/1991 | Park | 395/24 |
| 5,053,974 | 10/1991 | Penz | 395/22 |

FOREIGN PATENT DOCUMENTS 0307244 11/1989 United Kingdom.

OTHER PUBLICATIONS

OPTIK, vol. 76, No. 4, Jul. 1987, pp. 173–175, Wissenschaftliche Verlagsgesellschaft mbH, Stuttgart, DE; W. Stork: "Optical crossbar".

Journal of Lightwave Technology, vol. LT-3, No. 2, Apr. 1985, pp. 230–235, IEEE, New York, US; A. Himeno et al: "4×4 Optical-gate matrix switch".

Proceedings of the 1987 International Conference on Parallel Processing, Aug. 17th–21st 1987, pp. 755–758, the Pennsylvania State University Press; V. Cherkassky: "A coding scheme for concurrent error detection/correction in multistage interconnection networks".

Proceedings of the IEEE, vol. 54, No. 10, Oct. 1966, pp. 1419–1429; W. Kulcke et al: "Digital light deflectors".

Kosanke et al, IBM Technical Disclosure vol. 6, No. ID Mar. 1964, "Optical Read and Write Devices Using Electro-Optical Logic", pp. 61–62.

Soref, Optics Letters Vo. 6, No. 6 Jun. 1981, "Low--cross talk 2×2 optical switch" pp. 275–277.

Primary Examiner—Martin Lerner
Attorney, Agent, or Firm—Nixon & Vanderhye

[57] ABSTRACT

A binary tree switching network in which the switching states are configured to switch an input signal from a selected input to an output by means of a control code set having a minimum Hamming distance (d) greater than one which eliminates cross-talk of order (d−1) and less. Such a network may be used for switching optical signals by means of optical beam deflector stages, each having a variable polarization rotator and a polarization sensitive deflector. Elimination of first order cross-talk is readily achieved by a modification stage arranged to receive a single input from the preceding stages and to pass it to the output.

8 Claims, 4 Drawing Sheets

| CODE-WORDS | | | | | OUTPUT |
|---|---|---|---|---|---|
| e | d | c | b | a | |
| 0 | 0 | 0 | 0 | 0 | A |
| 1 | 0 | 1 | 1 | 0 | B |
| 0 | 1 | 1 | 0 | 1 | C |
| 1 | 1 | 0 | 1 | 1 | D |

Fig. 1a
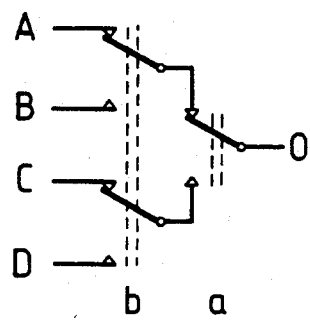
Fig. 1b
| CODE-WORDS | | OUTPUT |
|---|---|---|
| b | a | |
| 0 | 0 | A |
| 1 | 0 | B |
| 0 | 1 | C |
| 1 | 1 | D |
Fig. 2a
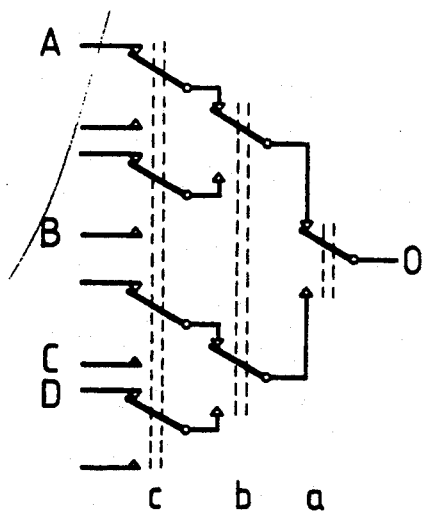
Fig. 2b
| CODE-WORDS | | | OUTPUT |
|---|---|---|---|
| c | b | a | |
| 0 | 0 | 0 | A |
| 1 | 1 | 0 | B |
| 1 | 0 | 1 | C |
| 0 | 1 | 1 | D |

| CODE-WORDS<br>e d c b a | OUTPUT |
|---|---|
| 0 0 0 0 0 | A |
| 1 0 1 1 0 | B |
| 0 1 1 0 1 | C |
| 1 1 0 1 1 | D |

| CODE-WORDS c b a | OUTPUT |
|---|---|
| 1 0 1 | A |
| 0 1 1 | B |
| 1 1 0 | C |
| 0 0 0 | D |

BINARY TREE SWITCHING NETWORK

The present invention relates to binary tree switching networks of particular but not exclusive application to optical space switches suitable, for example, for use in optical telephony.

Stage binary tree switching networks are employed in many types of telecommunications switching systems to select 1 from $N=2^n$ inputs, or to connect an input to one of $N=2^n$ outputs. For example, they find application in the well known splitter/combiner networks, beam steering networks employing digital light deflection, and time division switching/multiplexing networks.

It is known to construct a binary tree switching network in the form of an optical space switch from a number of stages, each stage comprising a variable polarisation cell (rotator) and a polarisation sensitive deflector. The stages are arranged such that when appropriate control signals are applied to the variable polarisation cells they change the polarisation state of light passing through the cells so that light is routed from a selected one of a number of spatially separate inputs to the output or from an input to one of a number of spatially separate outputs. The applicant's earlier application number GB8804202 discloses one example of such an optical switch.

In such switches the variable polarisation cells are typically formed from twisted nematic liquid crystal material. Such a cell rotates the plane of polarisation of incident light by 90° when switched OFF but when switched ON by a control signal allows light to pass through with its plane of polarisation unaltered. In practice the behaviour of such cells departs from the ideal. When the cell is switched ON or OFF a certain fraction of the incident light is left with its plane of polarisation rotated and unrotated respectively. At each switching stage therefore whilst most of the light is deflected to the correct port a certain fraction passes through to the wrong port. If subsequent stages route this portion of light to the output port it then appears as crosstalk in the output signal.

Each stage of a binary tree switching network of $2^n$ inputs or outputs can be considered to be a multi-pole crosspoint array followed by an interconnection pattern. If at each crosspoint a small fraction ($c << 1$) of any signal on the open contact is coupled onto the closed contact path, where it is assumed that c is the same for all crosspoint devices and that it is independent of switch state, 1-st order crosstalk arises at or from unselected output or input ports that are routed directly (or via closed contacts) to the unselected contacts of the crosspoints used in the selected circuit.

According to the present invention a binary tree switching network having a plurality of first ports and a second port includes two or more switching stages which are configured to switch the first ports to the second port by means of a control code set having a minimum Hamming distance greater than 1.

The applicant's invention may serve as a selector, in which a plurality of inputs are each switched to a selected output. Equally, due to its symmetry the present invention may serve as a connector in which a single input is connected to a plurality of outputs. For the sake of clarity, the invention will be hereinafter described in terms of a selector, although it is to be understood that it could also be used as a connector.

The applicant's invention is based on the realisation that all unselected input ports whose control codewords differ from the selected circuit control codeword in only one bit position will generate 1-st order crosstalk on the selected switching input. Since each connection must use n crosspoints, it follows that there exists n potential sources of 1-st order crosstalk for every connection, regardless of switch setting and that, generalising, m-th order crosstalk will originate from all unselected input ports that are m open crosspoints away from the selected path, that is, whose control codewords differ from the selected circuit code-word in m bit positions. A switching network according to the present invention will have no cross-talk of the order equal to 1 less the minimum Hamming distance d, of the control code set from the above described cross-talk mechanism because the control code set ensures all unselected input ports are at least $d-1$ open crosspoints from the selected path. This removes the constraints on the choice of switching configurations for routing particular inputs to the output and in particular makes possible the choice of configurations such that the unswitched input from a given stage never has a direct route to the output port of the optical switch.

The present invention finds application in optical beam steering interconnections employing digital light deflection to achieve the binary tree switching structure.

A device in accordance with the present invention will now be described in detail with reference to the accompanying drawings in which:

FIG. 1(A) is a schematic diagram of a generalised unmodified, two-stage binary tree switching network and FIG. 1(B) is a table of the corresponding linear block code-words, respectively;

FIG. 2(A) is a schematic diagram of a generalised three-stage binary tree switching network and FIG. 2(b) is a table of the corresponding even parity code-word set eliminating first order cross-talk from four inputs respectively;

Figures 3A, 3B:
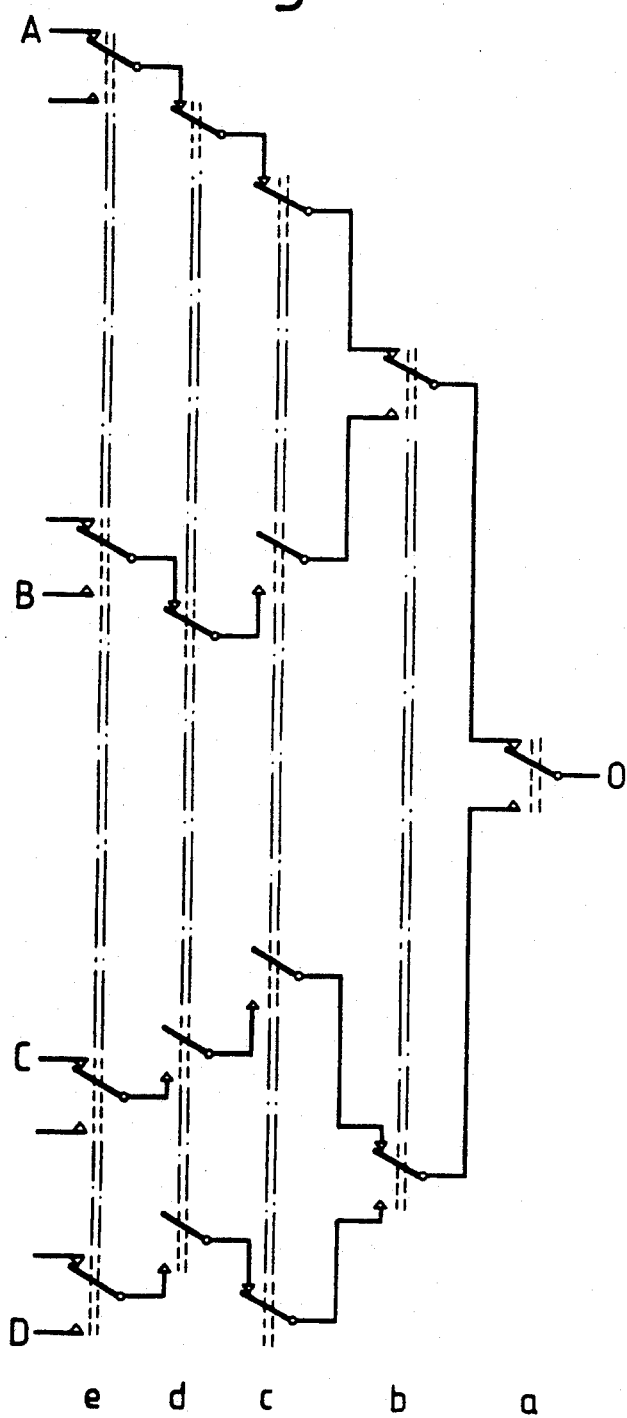
FIG. 3(A) is a schematic diagram of a five stage binary tree switching network and FIG. 3(b) is a table of a code-word set to eliminate 1st and 2nd order cross-talk, respectively.

This crosstalk property of a general binary tree switching network is expressed formally by equation 1.

$$X_{ij} = c^{d_{ij}} \qquad (1)$$

where $X_{ij}$ is the fraction of undesired energy coupled from some unselected input port i onto the selected path from input j, and $$d_{ij} = \sum_{\text{ones}} \text{code-word}_i \times \text{code-word}_j \qquad (2)$$

is the Hamming Distance between the two code words. ($\times$ = Exclusive OR.) If we assume that all input ports have the same input signal level, then the total crosstalk fraction is found by summing equation (1) over all $i \neq j$:

$$X = \sum_{i \neq j} c^{dij} \text{ for all } j \tag{3}$$

To minimise the total crosstalk we must maximise the minimum Hamming distance (denoted d) of the control codes. For a set of control code words having a minimum Hamming distance d then all crosstalk of order d−1 or lower is eliminated.

An un-modified n-stage binary tree selection network requires a complete set of $N=2^n$ distinct code words, each of length $n=\log_2(N)$ bits. Such a code set is the linear block code of size (n,n) (using the notation of R. E. Blahut's book entitled "Theory and Practice of Error Code Controls: Addison-Wesley Publishing Co. London 1983) and, as already shown, has d=1. FIG. 1A shows such an unmodified binary tree selection network capable of switching any one of four inputs A, B, C, D to an output O by means of the two binary stages a and b. FIG. 1B lists the linear block code of size (2,2) applicable to the switch stages a and b and the input that is switched to the output.

In order to eliminate crosstalk of order m and lower we must use an (n+k,n) code (where k>m) and, therefore, at least n+k switching stages. For some cases it will be found k=m in which case the code set is said to be a maximum distance code.

Elimination of 1-st order crosstalk (m=1)

In the special case of m=1, (n+1,n) maximum distance codes exist for all n. The simplest means of finding the (n+1,n) code set is to generate either the even or odd parity-check codes from the (n,n) code set. First order crosstalk can be eliminated by equipping the $N=2^n$ input port locations of an n+1 stage selector which correspond to the even (or odd) parity-check code set.

FIG. 2A shows a binary tree selection network capable of switching any one of four inputs A,B,C,D to an output O eliminating first order crosstalk. It has three binary stages a, b and c corresponding to the required (3,2) control code set. FIG. 2B lists the even-parity check codes where column c contains the parity check bits as an example. Once the code-word set has been derived, the number of bits gives the required number of stages and the appropriate input lines of the first stage, c, identified by applying the codes words to the network.

Elimination of crosstalk up to m-th order:

An $N=2^n$ port selector switch with n+m stages could eliminate all crosstalk of order m or lower if a maximum distance control code set can be found that has a minimum Hamming distance of m+1. In practice, however, there are very few codes that can achieve this lower bound. In general, we must use an (n+k,n) code set with k>m. Once a suitable code set has been selected the $2^n$ inputs can be assigned to the appropriate inputs of the first stage as described above.

Consider for example a network to eliminate all second order cross-talk from a switching network having four inputs. In this case there is no maximum distance four input code. The smallest k for which a suitable code set exists, (i.e. for d=3) is k=3. That is, the switching network requires three stages in addition to two of an unmodified, four-input, binary network. FIG. 3B lists a suitable code word set. From this list the appropriate input connections of the first stage e are identifiable producing the network shown in FIG. 3A which has the five stages a to e connecting any one of inputs A,B,C,D to the output O with no 2nd or 1st order cross-talk. The network shown in FIG. 3A is an adaptation of a standard binary tree in which all unused crossports in stages d and e have been removed. Code-words from two or more codes may be concatenated in order to generate a code with any arbitrary minimum distance. If two codes of the same size (number of code-words) with minimum distances d1 and d2 are concatenated, then the resultant code will have a minimum distance of d1+d2. Here for example, the code given in FIG. 3B has a minimum distance of 3 and was generated by concatenating the two codes given in FIGS. 1B and 2B of minimum distance 1 and 2 respectively. (This principle can be extended to any number of concatenated code-words.)

Figures 4A, 4B:
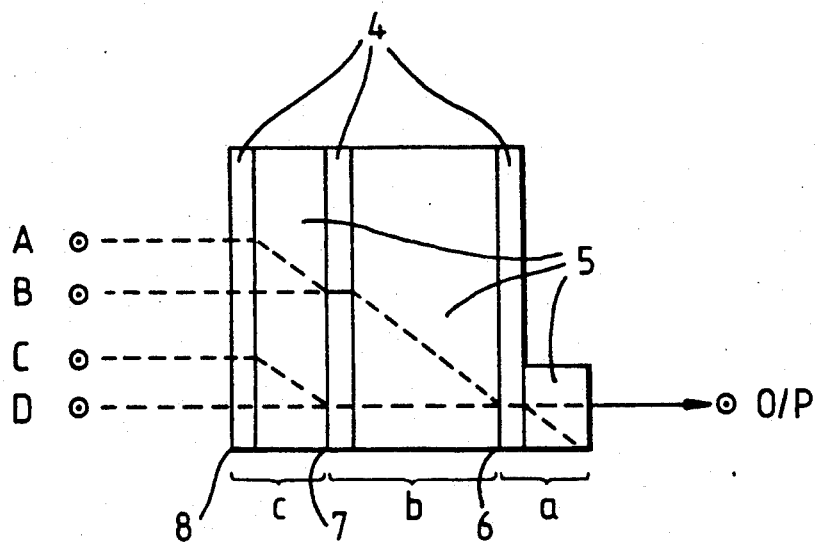
FIG. 4(A) is a side elevation of a first example of an optical switch and FIG. 4(b) is a table of an appropriate code set for the switch in FIG. 4(a).

Referring now to FIG. 4A an optical space switch comprises an optical implementation of a three stage binary tree switching network that is one which eliminates first order cross-talk. It has three stages a, b, c arranged in series between an input side and an output side. Each stage comprises a variable polarisation cell 4 (rotator) formed of twisted nematic liquid crystal material and a polarisation sensitive deflector 5 arranged to deflect or pass undeflected according to its polarisation state light received from the variable polarisation cell 4. Electrodes (omitted for clarity) are formed on each variable polarisation cell 4. Control signals from lines 6, 7 and 8 are applied to the electrodes 5 of cells a, b and c respectively in order to switch the variable polarisation cells 4 ON or OFF.

In use, linearly polarised light enters the switch from four spatially separate inputs A, B, C, D. Light from a selected input passes through the three stages c, b and a to the output of the switch. The stage a on the output side of the switch is a modification stage of reduced size by comparison with the other stages b and c. The modification stage a, is arranged to receive a single input from the preceding stages and to pass the light through to the output stage, alternatively to deflect the received light signal, in accordance with the polarisation state of the incident light and the control signal applied to line 6.

Figure 5:
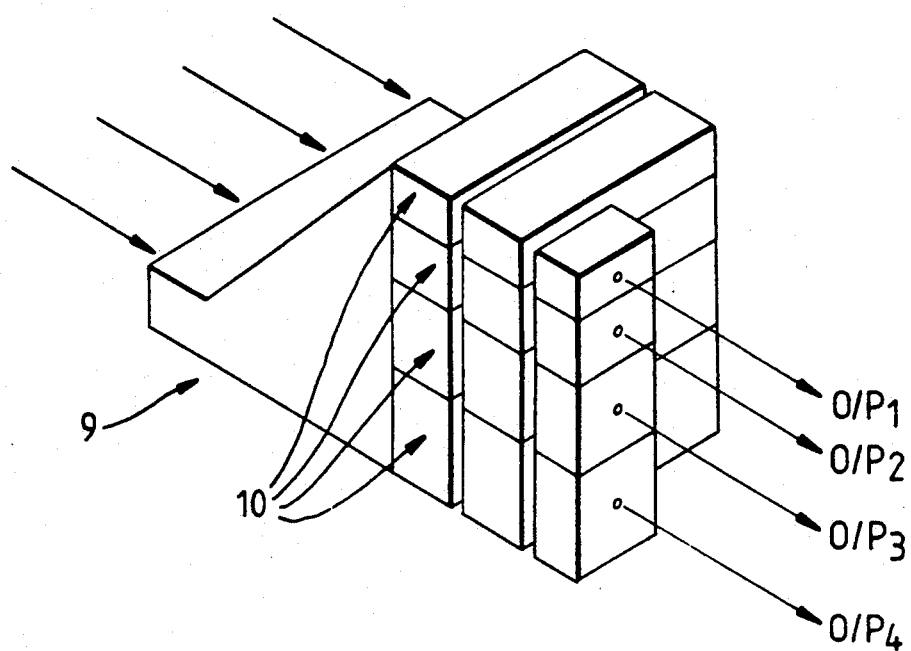
FIG. 5 is a perspective view of an optical connector incorporating the switch of the first example; and, FIG. 6 is a side elevation of a further example.

In an alternative embodiment shown in FIG. 5, an optical connector includes a number of switching elements 10 each corresponding to the switch shown in FIG. 4 arranged one above the other in direction normal to the signal paths. A set of N optical distributors 9, where $N=2^n$, are arranged in parallel but orthogonal to switching elements 10 on the input side of the switch. The optical distributor 9 is described in the applicant's co-pending application GB 8721472. Each distributor 9 makes N copies of the signal provided at its input. The connector as a whole therefore can switch any one of the N inputs to a selected one of N outputs. That is, it is an NxN switch. The switch needs only N modification stages and these may in practice be formed by a single calcite polarisation sensitive deflector with N variable polarisation cells.

Imperfections in variable polarisation cells, such as the twisted nematic liquid crystal cells of the embodiments described, lead to imperfect switching of the state of polarisation of the light and so some power is routed to the wrong output ports. At each switching stage a fraction (1−c) of each signal beam is switched to the correct port while a fraction (c) remains unswitched and goes to the wrong port. It is assumed that c is the same for all stages and that it is independent of switch state. (Signal attenuation may be ignored since it does not affect the results of the crosstalk analysis). The unswitched light from each stage causes crosstalk if it is subsequently routed by other stages to the switch output port. First order crosstalk can only occur if the undesired signal component is routed directly via switched paths from the stage at which the crosstalk arises to the switch output port. Crosstalk also occurs if the undesired signal can reach the switch output port via non-switched paths, that is by crosstalk at subsequent stages, however, in this case it is reduced to at least second order (i.e. $c^2$).

FIG. 4B shows an appropriate code set for the switch of FIG. 4A. The most efficient means of realising 1st order cross talk elimination in an optical space switch is to provide one additional deflection stage, a "modification stage" of the smallest size, at the output port, as shown in FIG. 4A. The additional deflection stage operates on only a single signal path but is effective to double the number of switching states of the switch as a whole and so to make possible the choice of a control code set with the required minimum Hamming distance of 2. The optical space switch behaves likes a $2 \times N$ deflector with a minimum Hamming distance of 2 control code set, but with a size comparable to the $1 \times N$ deflector. For an $N \times N$ switch such as that shown in FIG. 5 the physical size of the switch is increased by the minimum possible factor of $N/(N-1)$. The additional control stage increases the number of switch control lines/crosspoints to $N \log_2(N) + N$, that is $N \log_2(2N)$.

Figure 6:
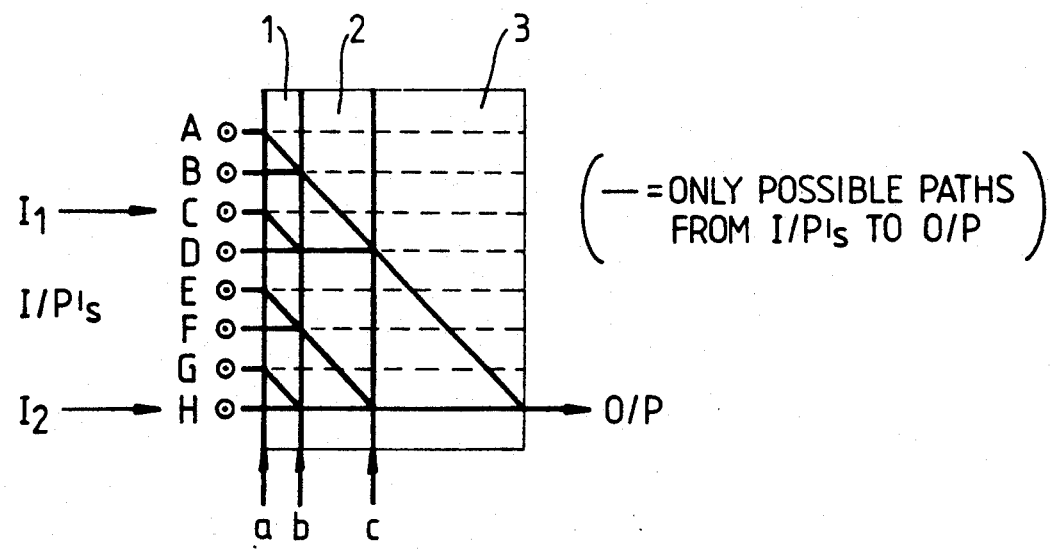

FIG. 6 shows a further example in which higher order crosstalk is eliminated. This is a three stage switch having a potential maximum of eight inputs A–H. From these eight inputs only a single pair of inputs is enabled. Suitable pair (H,C), for example, have control codes (000,111), giving a minimum Hamming distance of 3. In this case $n=1$, $m=2$ and all crosstalk of order 2 or lower is eliminated.

The present invention is applicable to any binary tree switching network in which cross-talk can be introduced across the unswitched cross-points—for example electrical switching networks.

I claim:

1. A binary tree switching network comprising a plurality of first ports and a second port including two or more switching stages, the switching stages being configured to switch the first ports to the second port by means of a control code set wherein to reduce crosstalk each control code has a predetermined minimum Hamming distance between all of the other control codes in the set greater than 1.

2. A network according to claim 1 in which each stage comprises an optical beam deflector.

3. A network according to claim 1 wherein the first ports are inputs, and the second port is an output.

4. A network according to claim 1 wherein the first ports are outputs, and the second port is an input.

5. A binary tree switching network for reducing crosstalk comprising:
a plurality of first ports and a second port including two or more switching stages, the switching stages being configured to switch the first ports to the second port by means of a control code set wherein each control code has a minimum Hamming distance between all of the other control codes in the set greater than 1, wherein each stage includes an optical beam deflector including a variable polarisation rotator and a polarisation sensitive deflector.

6. A network according to claim 5 in which one of the stages is a modification stage smaller than the other stages for receiving a single input from the preceding stages and to pass said input signal to the output.

7. A switching network comprising a plurality of first ports and a second port with two or more switching stages between the first ports and the second port, said switching stages configured to selectively enable signal paths through the switching network from the first ports to the second port based on binary control codes associated with each path, the binary digits of each control code corresponding to the state of each switch in the path, wherein those paths are selected whose corresponding control codes differ from all other control codes by two or more digits wherein the selected signal paths minimize cross-talk between signals on selected and unselected switching configurations.

8. The switching network of claim 7 wherein the network is a cross-point switch in control codes of the selected paths have a minimum Hamming distance d greater than 1 such that input ports for unselected paths are at least $d-1$ open cross-points from the selected path.

* * * * *